C. LUNDGHREN & G. E. ANDERSON.
CULTIVATOR SWEEP.
APPLICATION FILED SEPT. 12, 1910.
984,146.
Patented Feb. 14, 1911.
Fig. 1.
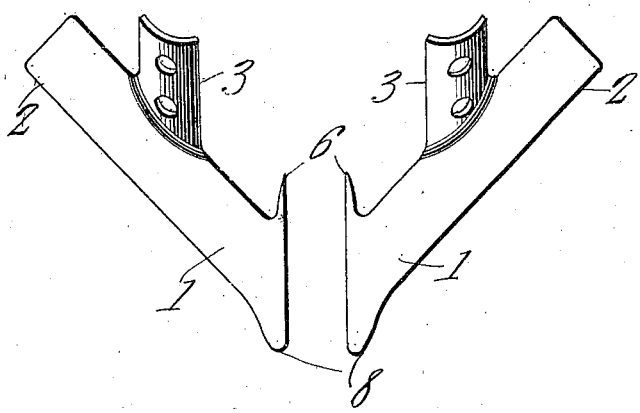
Fig. 2.
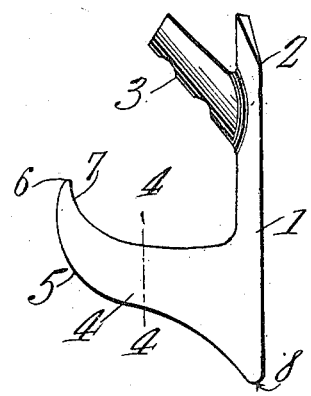
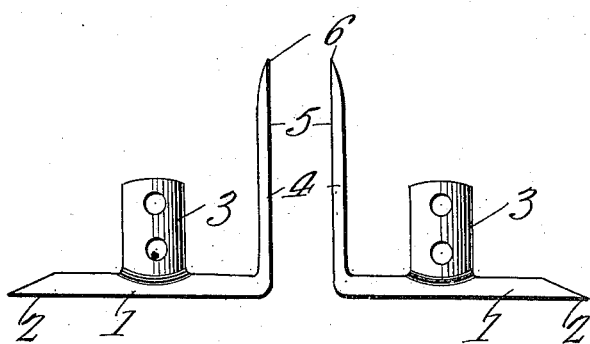
Fig. 3.
Fig. 4.
Witnesses
Charles Lundghren
Gus E. Anderson,
Inventors
by
Attorneys
THE NORRIS PETERS CO., WASHINGTON, D. C.

UNITED STATES PATENT OFFICE.

CHARLES LUNDGHREN AND GUS E. ANDERSON, OF AUSTIN, TEXAS.

CULTIVATOR-SWEEP.

984,146.  Specification of Letters Patent.  Patented Feb. 14, 1911.

Application filed September 12, 1910. Serial No. 581,577.

*To all whom it may concern:*

Be it known that we, CHARLES LUNDGHREN and GUS E. ANDERSON, citizens of the United States, residing at Austin, in the county of Travis, State of Texas, have invented a new and useful Cultivator-Sweep, of which the following is a specification.

This invention relates to cultivator sweeps and consists in the novel configuration hereinafter shown, described and claimed.

The object of the invention is to provide a sweep of peculiar configuration and especially adapted to be used in pairs the members of which are located at opposite sides of a row of upstanding plants the purpose being to provide a sweep which will cut out objectionable growths which may be in close proximity to the standing plants and which will sever running vines which may lie transversely across the line of the row of plants.

Wth this object in view the sweep includes a portion which possesses a cutting edge adapted to lie approximately horizontal at the surface of the soil and a vertically disposed portion formed at the inner end of the first said portion and having a forward cutting edge which is curved rearwardly toward its upper end. The sweep is also provided with a shank portion to which may be attached a beam or standard.

In the accompanying drawings:—Figure 1 is a top plan view of a pair of sweeps showing their relative positions. Fig. 2 is a side elevation of one of the sweeps. Fig. 3 is a front end elevation of a pair of sweeps. Fig. 4 is a transverse sectional view of a portion of the sweep cut on the line 4—4 of Fig. 2.

Aside from the fact that the sweeps which constitute a pair are right and left their structures and configurations are identical and a description of one will answer for both.

Each sweep consists of a lower portion 1 which is downwardly inclined toward its forward edge and which is provided with a forward cutting edge 2. Each sweep is provided at a point intermediate the ends of the portion 1 with an upstanding shank 3 which is adapted to be attached to a beam or standard of a cultivator. A vertically disposed portion 4 is formed at the inner end of the portion 1 and is provided with a forward cutting edge 5 which is rearwardly curved toward its upper end.

When the sweep members are assembled in a pair adapted to be used at the opposite sides of a row of standing plants their inner end portions are spaced from each other in the manner as indicated in Figs. 1 and 3 of the drawings and when so positioned they move along at the surface of the soil and at the opposite sides of a row of plants, the plants passing through the space between the inner end portions of the sweep members. When so moved the forward cutting edge 2 of the portion 1 will sever the plants standing outside of the row and at the surface of the ground while the forward cutting edge 5 of the portion 4 will sever any running vines which may lie transversely across the row in which the plants stand. The sweep members are formed from comparatively thin metal and in their operation upon the objectionable plants at the side of a row of plants they are not intended to disturb the soil to any material extent and after the objectionable growths have been severed at the surface of the soil or in the vicinity thereof the cut plants are permitted to fall over the rear edge portion of the sweeps and lie prostrate upon the ground. The upper end of each portion 4 of sweep is approximately pointed as at 6 and the said pointed portions 6 are rearwardly disposed in the manner as indicated in Fig. 2 of the drawings. Upon the pointed extremities 6 the rear edge of the portion 4 is concaved as at 7 or in other words the transverse breadth of the portion 4 toward its upper end is reduced in order that there will not be sufficient material in the uppermost portion of the said portion 4 to offer surface against which the cut plants may drag and follow the sweep. Each sweep is pointed as at 8, the said point occurring approximately at the angle formed by the meeting cutting edges 5 and 2. The said points 8 are forwardly disposed and are designed to separate the plants at the surface of the soil and guide the sweep against those plants intended to be cut.

Having described the invention what is claimed is:—

A sweep formed with a downwardly and forwardly inclined portion terminating in a forward cutting edge adapted to lie approximately horizontal at the surface of the soil and provided at its rear edge and at a point between its ends with an upwardly disposed shank and having a vertically disposed portion formed at the inner end of the first mentioned portion said vertically disposed portion having a forward cutting edge which is rearwardly disposed toward its upper end the cutting edges of the two portions coming together at a point formed at the inner end of the first mentioned portion and the lower end of the second mentioned portion the upper end of the second mentioned portion terminating in a point which is rearwardly disposed and the rear edge of the vertically disposed portion being concaved.

In testimony that we claim the foregoing as our own, we have hereto affixed our signatures in the presence of two witnesses.

CHAS. LUNDGHREN.
GUS E. ANDERSON.

Witnesses:
G. A. NELSON,
N. H. DORFLINGER.